US011949196B2

(12) United States Patent
Watanabe et al.

(10) Patent No.: US 11,949,196 B2
(45) Date of Patent: Apr. 2, 2024

(54) BRAIDED PART CONNECTION STRUCTURE

(71) Applicant: Yazaki Corporation, Tokyo (JP)

(72) Inventors: Kazuma Watanabe, Kakegawa (JP); Hideki Mizuno, Kakegawa (JP); Yasuhiro Yamaguchi, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 17/554,104

(22) Filed: Dec. 17, 2021

(65) Prior Publication Data

US 2022/0200170 A1 Jun. 23, 2022

(30) Foreign Application Priority Data

Dec. 18, 2020 (JP) ................................ 2020-210715

(51) Int. Cl.
*H01R 4/02* (2006.01)
*H01R 4/60* (2006.01)
*H01R 4/18* (2006.01)

(52) U.S. Cl.
CPC ............... *H01R 4/023* (2013.01); *H01R 4/60* (2013.01); *H01R 4/187* (2013.01)

(58) Field of Classification Search
CPC ............... H01R 4/02; H01R 4/60; H01R 9/05
See application file for complete search history.

(56) References Cited

U.S. PATENT DOCUMENTS 5,024,608 A * 6/1991 Heng .................. H01R 9/0503 439/578
5,994,646 A 11/1999 Broeksteeg et al.
6,123,556 A * 9/2000 Asakura ............ H01R 43/0207 29/863
7,491,071 B2 * 2/2009 Hamai ................ H02G 3/0666 439/98
10,008,307 B1 * 6/2018 Lanoe .................... H01B 7/295
2004/0099428 A1 * 5/2004 Miyazaki ............ H01R 13/655 174/366
2007/0190868 A1 * 8/2007 De Cloet ........... H01R 13/6277 439/851
2012/0214339 A1 * 8/2012 Stein ................. H01R 13/6315 439/578

(Continued)

FOREIGN PATENT DOCUMENTS

GB 2332992 * 7/1999
JP H11-509672 A 8/1999

(Continued)

*Primary Examiner* — Chau N Nguyen
(74) *Attorney, Agent, or Firm* — Banner & Witcoff, Ltd.

(57) ABSTRACT

A braided part connection structure includes a braided part having a tubular shape covering an insulated wire along a longitudinal direction of the braided part connection structure and a shield member having a tubular shape and electrically connected and fixed to the braided part. The shield member includes a braided part joining portion having a plurality of openings arranged at intervals along a circumferential direction of the shield member in a portion of the shield member in the longitudinal direction, and a welding portion defined by two openings adjacent to each other of the plurality of openings. The braided part covers the braided part joining portion and is welded to the welding portion.

8 Claims, 6 Drawing Sheets

(56) References Cited

U.S. PATENT DOCUMENTS

| | | | | |
|---|---|---|---|---|
| 2014/0326501 | A1* | 11/2014 | Lienert | H01R 4/02<br>219/78.15 |
| 2014/0367157 | A1 | 12/2014 | Kawamura | |
| 2015/0099397 | A1* | 4/2015 | Listing | H01R 4/646<br>439/607.41 |
| 2019/0334296 | A1* | 10/2019 | Watkins | H01R 13/622 |

FOREIGN PATENT DOCUMENTS

| | | | |
|---|---|---|---|
| JP | 2009-272128 | * | 11/2009 |
| JP | 2010-198811 | A | 9/2010 |
| JP | 2013-084510 | A | 5/2013 |

* cited by examiner

BRAIDED PART CONNECTION STRUCTURE

CROSS-REFERENCE TO RELATED APPLICATIONS

The present application claims priority to Japanese Patent Application No. 2020-210715 flied on Dec. 18, 2020, the entire content of which is incorporated herein by reference.

TECHNICAL FIELD

The present invention relates to a braided part connection structure.

BACKGROUND

In a related art shield connection structure, an outer ring is attached to an outer periphery of a shield braided wire (braided part) covering an outer periphery of a shielded electric cable, and overlapping portions of the outer ring and the shield braided wire are joined by spot welding by means of laser welding or resistance welding at a plurality of positions in a circumferential direction (see, for example, JPH11-509672A).

When the overlapping portion of the outer ring and the shield braided wire is subjected to the spot welding, thermal energy is transmitted from a welded portion to the outer ring or the like and escapes. For this reason, it is necessary to increase the output of the laser and the electric power for welding, and there is a problem that the efficiency is lowered.

SUMMARY

Illustrative aspects of the present invention provide a braided part connection structure configured to efficiently weld and connect a shield member and a braided part to each other.

According to an illustrative aspect of the present invention, a braided part connection structure includes a braided part having a tubular shape covering an insulated wire along a longitudinal direction of the braided part connection structure and a shield member having a tubular shape and electrically connected and fixed to the braided part. The shield member includes a braided part joining portion having a plurality of openings arranged at intervals along a circumferential direction of the shield member in a portion of the shield member in the longitudinal direction, and a welding portion defined by two openings adjacent to each other of the plurality of openings. The braided part covers the braided part joining portion and is welded to the welding portion.

Other aspects and advantages of the invention will be apparent from the following description, the drawings and the claims.

BRIEF DESCRIPTION OF DRAWINGS

FIGS. 6A and 6B are views illustrating a braided part connection structure according to other embodiments of the present invention, in which FIG. 6A is a perspective view of a main part showing a modification of a welding portion in a shield member, and FIG. 6B is a perspective view of a main part showing a modification of a braided part joining portion in a shield member.

DESCRIPTION OF EMBODIMENTS

Figure 1:
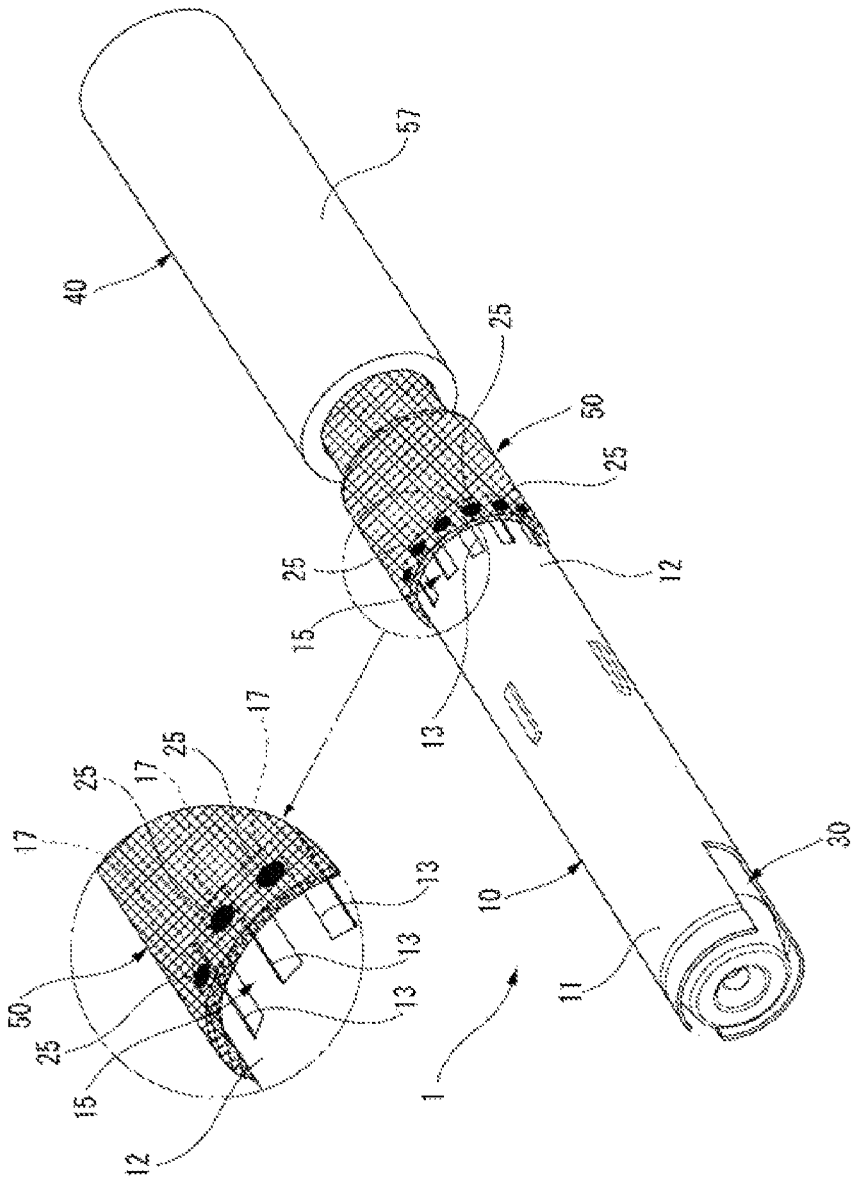
FIG. 1 is a view illustrating a braided part connection structure according to an embodiment of the present invention, and is showing a perspective view and an enlarged view of a main part showing a state in which a shield member and a braided part in a shield assembly are connected to each other.
Figure 2:
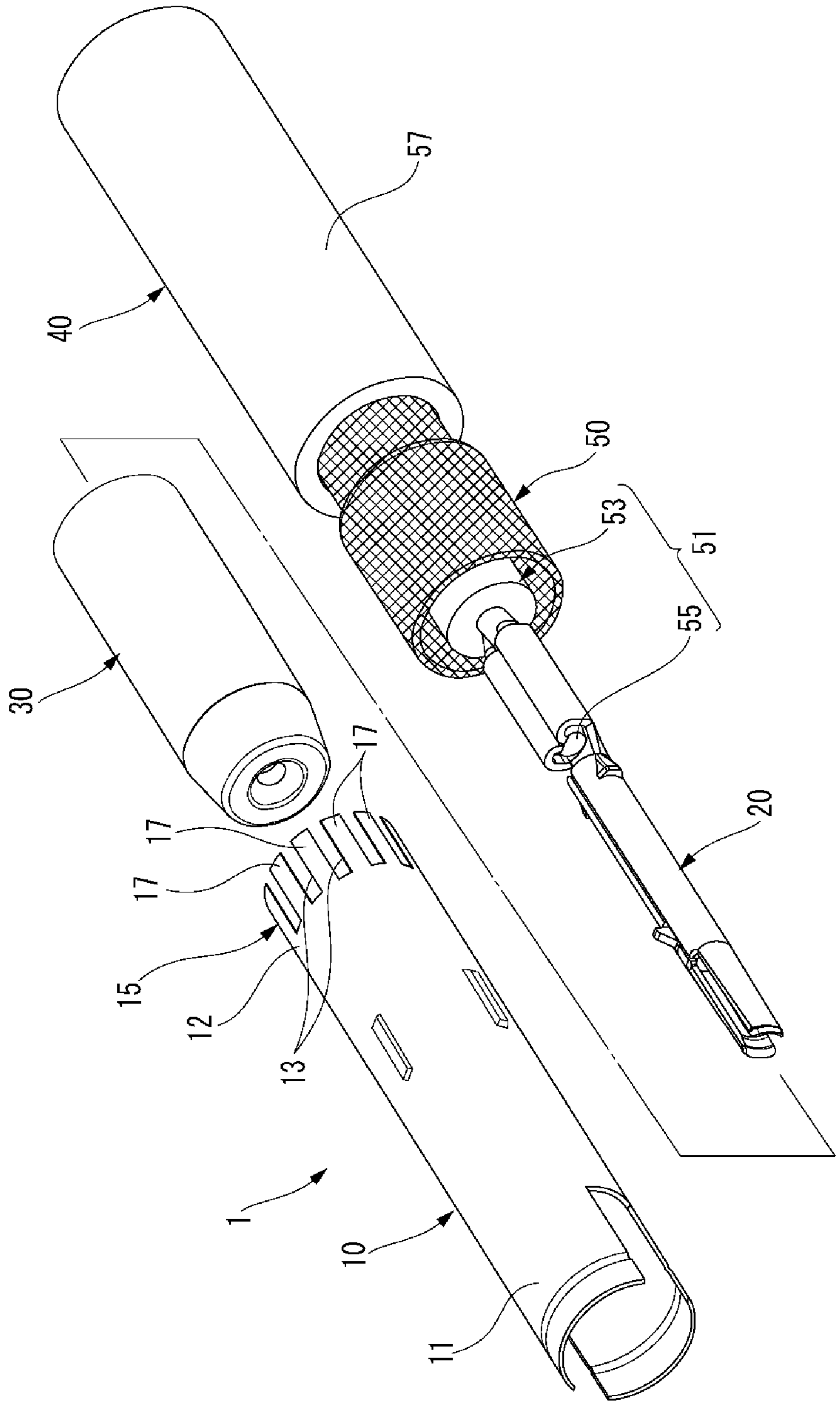
FIG. 2 is an exploded perspective view of the shield assembly shown in FIG. 1.

Hereinafter, embodiments of the invention will be described with reference to the drawings. FIG. 1 is a view illustrating a braided part connection structure according to an embodiment of the present invention, and is showing a perspective view and an enlarged view of a main part showing a state in which a shield outer terminal (shield member) 10 and a braided part 50 in a shield assembly 1 are connected to each other. FIG. 2 is an exploded perspective view of the shield assembly 1 shown in FIG. 1.

As shown in FIGS. 1 and 2, the braided part connection structure according to the present embodiment is a braided part connection structure to be used, for example in the shield assembly 1 of a high-frequency connector to be attached to an end of a shielded cable 40. The braided part connection structure includes the braided part 50 having a tubular shape that covers an insulated electrical wire 51 in a longitudinal direction, and the shield outer terminal 10 that is a tubular shield member to be electrically connected and fixed to the braided part 50.

The shielded cable 40 is a coaxial cable including the insulated electrical wire 51 in which a core wire (conductor) 55 is covered with an insulator 53, the tubular braided part 50 covering the insulated electrical wire 51 in the longitudinal direction, and an outer sheath 57 covering the outer periphery of the braided part 50 (see FIG. 2). The core wire 55 having conductivity may be either a single wire or a twisted wire obtained by twisting a plurality of wires. The insulator 53 has an electrical insulation property and covers the core wire 55. In the present embodiment, the shielded cable 40 is a coaxial cable having the braided part 50, but other configurations are not excluded as long as the shielded cable 40 is a cable having the braided part 50.

The shield assembly 1 is accommodated in an outer housing (not shown) formed of a synthetic resin having an electrical insulation property of a high-frequency connector, and the shield assembly 1 is to be connected to the end of the shielded cable 40. The shield assembly 1 according to the present embodiment includes an inner terminal 20, an inner housing 30, and the shield outer terminal (shield member) 10.

The inner terminal 20 is formed in a tubular shape by a conductive metal, and is to be electrically connected to the core wire 55 of the shielded cable 40 by crimping. The inner housing 30 is formed of an electrically insulating synthetic resin, and accommodates and holds the inner terminal 20 in an inner terminal accommodating chamber.

The shield outer terminal 10 as a shield member according to the present embodiment has an inner housing accommodating chamber which is formed in a cylindrical shape and accommodates the inner housing 30. The shield outer terminal 10 is formed by, for example, pressing a conductive metal plate such as copper or a copper alloy. As shown in FIG. 2, one end side of the shield outer terminal 10 being the shield member serves as a fitting end 11, and the fitting end 11 is to be fitted and electrically connected to a shield outer terminal (not shown) which is a shield member of a fitting counterpart. The other end side of the shield outer terminal 10 is a braided part connection end 12, and the braided part 50 is to be connected to the braided part connection end 12.

As shown in FIG. 2, the shield outer terminal 10 has a braided part joining portion 15 at which a plurality of openings 13 are formed at the braided part connection end 12, which is the other end side of the shield outer terminal 10. The openings 13 are formed at intervals along the circumferential direction of the shield outer terminal 10. In the braided part joining portion 15, welding portions 17 are formed between the openings 13 adjacent to each other in the circumferential direction. In the present embodiment, the opening 13 of the braided part joining portion 15 is a notched hole having an open end, and the welding portion 17 is a cantilevered protruding piece defined between adjacent notched holes. As a result, the braided part joining portion 15 is formed in a comb tooth shape over the circumferential direction. A width dimension along the circumferential direction of the openings 13 and the welding portions 17 and an interval between adjacent openings 13 and welding portions 17 formed in the braided part joining portion 15 of the shield outer terminal 10 are appropriately set depending on the required strength, the electrical resistance at the time of being connected to the braided part 50, and the like.

The braided part 50 is formed by braiding wires made of a conductive metal material such as copper or a copper alloy, and is formed in a tubular shape. The braided part 50 is provided so as to cover the insulated electrical wire 51 along the longitudinal direction. The insulated electrical wire 51 has the core wire 55 at the center of the insulator 53. The outer periphery of the braided part 50 is covered with the outer sheath 57, and an end portion of the braided part 50 to be connected to the shield outer terminal 10 is exposed from the outer sheath 57 (see FIGS. 1 and 2), where the exposed end portion of the braided part 50 includes a first part and a second part.

The end portion of the insulated electrical wire 51 is to be inserted into the shield outer terminal 10 at the braided part connection end 12. In this state, the end portion of the braided part 50 covers the braided part joining portion 15 at the braided part connection end 12 of the shield outer terminal 10.

The braided part 50 covering the braided part joining portion 15 of the shield outer terminal 10 is welded to the welding portion 17 formed of the protruding piece to together form a welding connection portion 25. The shield outer terminal 10 and the braided part 50 are electrically connected to each other at the welding connection portion 25 formed by welding the welding portion 17 and the second part of the exposed end portion of the braided part 50.

Figure 3:
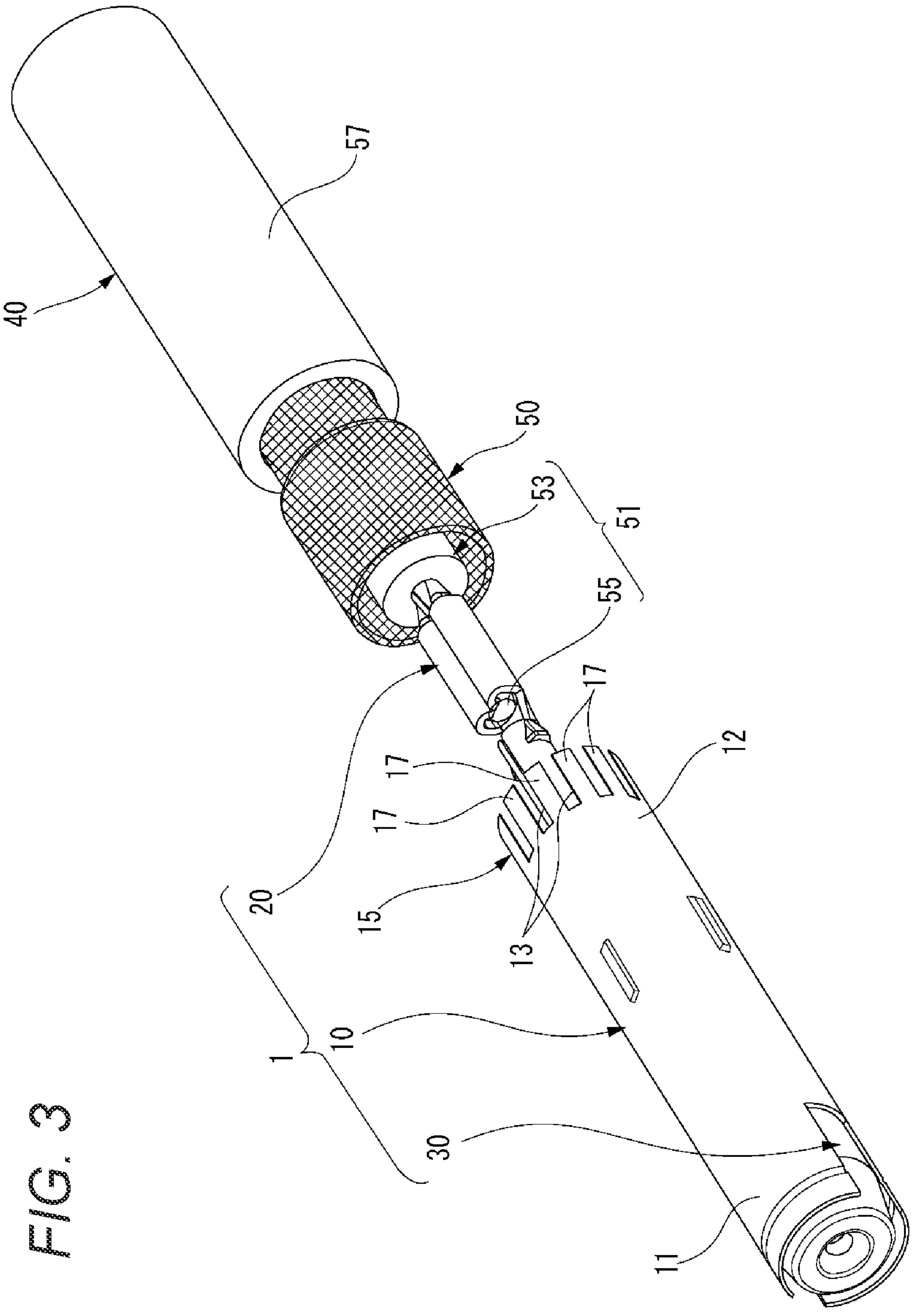
FIG. 3 is a perspective view showing a state immediately before the shield member and the braided part get connected to each other.
Figure 4:
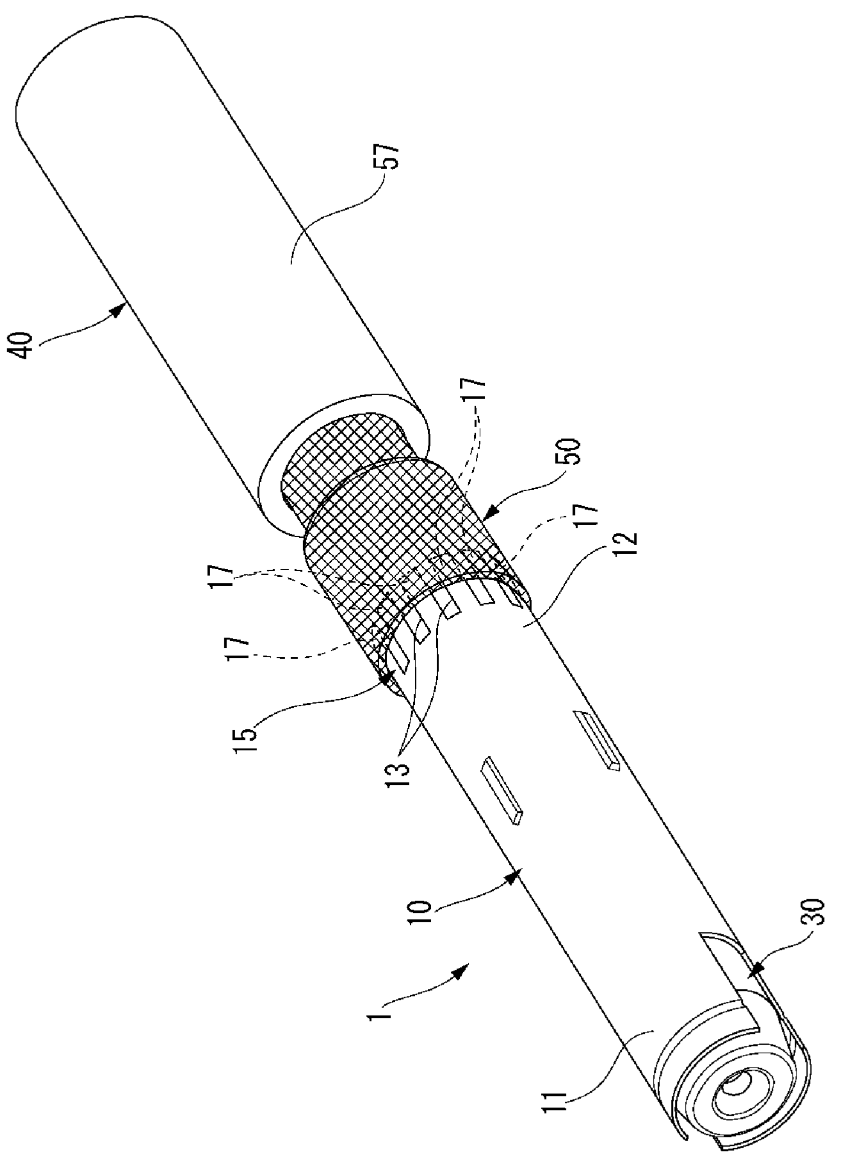
FIG. 4 is a perspective view showing a state in which a braided part joining portion of the shield member is covered with the braided part.
Figure 5A:
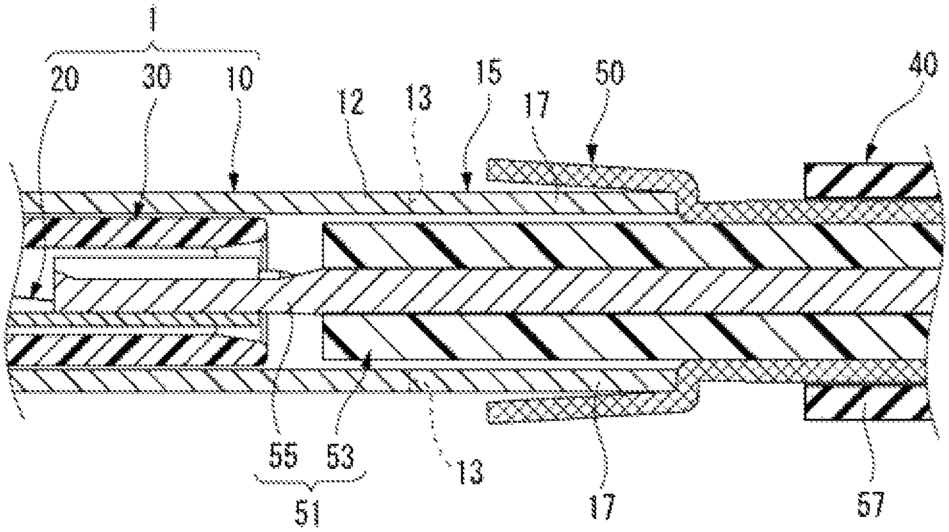
FIG. 5A is a longitudinal sectional view showing the state in which the braided part joining portion of the shield member is covered with the braided part.

Next, how the braided part 50 gets connected to the shield outer terminal 10, which is the shield member, will be described. FIG. 3 is a perspective view showing a state immediately before the shield outer terminal 10, which is the shield member, and the braided part 50 get connected to each other. FIG. 4 is a perspective view showing a state in which the braided part joining portion 15 of the shield outer terminal 10 is covered with the braided part 50. FIG. 5A is a longitudinal sectional view showing the state in which the braided part joining portion 15 of the shield outer terminal 10 is covered with the braided part 50, and FIG. 5B is a longitudinal sectional view showing a step of welding the braided part 50 covering the braided part joining portion 15 to the welding portion 17.

First, as shown in FIG. 3, the braided part 50 is loosened, and the braided part 50 is widened in a radial direction so as to form a gap between the braided part 50 and the insulator 53. Next, the inner terminal 20 is brought to be accommodated in the inner terminal accommodating chamber of the inner housing 30, and the inner terminal 20, the core wire 55, and the insulator 53 are brought to be inserted into the braided part connection end 12 of the shield outer terminal 10 in order to dispose the braided part joining portion 15 of the shield outer terminal 10 between the braided part 50 and the insulator 53. Then, as shown in FIGS. 4 and 5A, the end portion of the braided part 50 covers the braided part joining portion 15. In this way, the end portion of the braided part 50 is overlapped with the outer peripheral side of the welding portions 17 formed of the plurality of protruding pieces of the braided part joining portion 15.

Figure 5B:
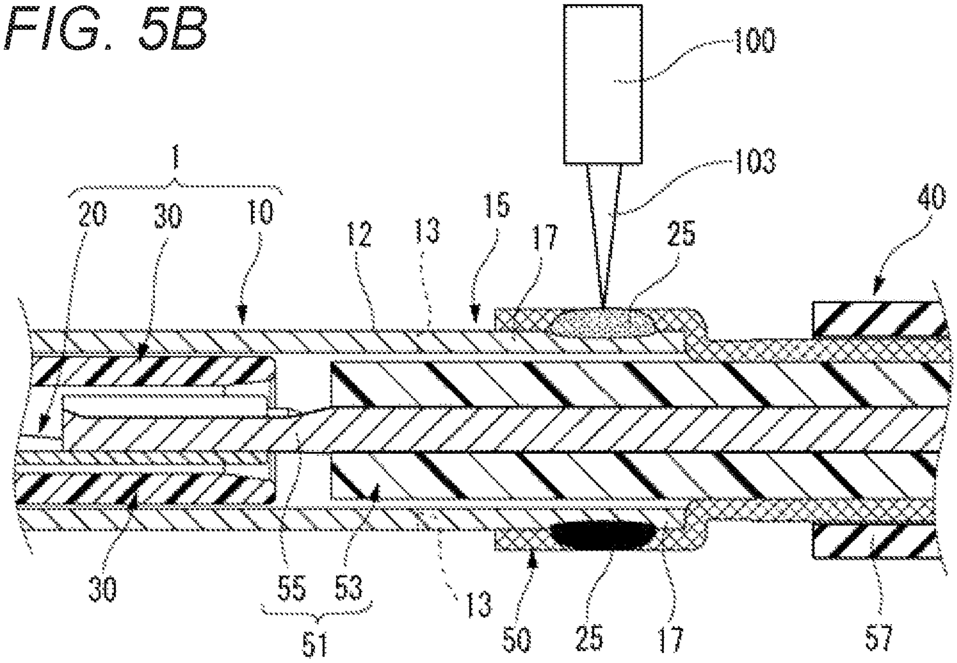
FIG. 5B is a longitudinal sectional view showing a step of welding the braided part covering the braided part joining portion to a welding portion.

Next, as shown in FIG. 5B, a laser irradiation device 100 is used to irradiate a plurality of overlapping portions of the end portion of the braided part 50 which are overlapped with the welding portions 17, with a laser beam 103 to weld the braided part 50 and the welding portions 17 to each other. Then, the welding connection portions 25 at which the braided part 50 is welded to the welding portions 17 is formed at the overlapping portions of the welding portions 17 and the braided part 50. As a result, the braided part joining portion 15 of the braided part connection end 12 of the shield outer terminal 10 and the end portion of the braided part 50 are electrically connected to each other. A method for welding the shield outer terminal 10 and the braided part 50 to each other is not limited to laser welding, and various welding methods such as resistance welding or ultrasonic welding may be applied.

Here, when the braided part joining portion 15 of the shield outer terminal 10 and the end portion of the braided part 50 are connected to each other, the braided part joining portion 15 is formed with the openings 13 which are a plurality of notched holes whose end portions are opened to form the welding portions 17 formed of the plurality of protruding pieces. Therefore, the transfer of the thermal energy applied when the braided part 50 is welded to the welding portions 17 to the periphery area thereof is reduced. As a result, the overlapping portions of the welding portions 17 and the braided part 50 can be efficiently welded by the applied thermal energy.

As described above, according to the braided part connection structure of the present embodiment, the braided part 50 covering the braided part joining portion 15 of the shield outer terminal 10 is welded to the welding portions 17 between the plurality of openings 13 formed at intervals along the circumferential direction. Therefore, in the braided part connection structure of the present embodiment, a volume of the welding portion 17 which is a portion of the shield outer terminal 10 to which the braided part 50 is welded is reduced, thereby reducing the heat capacity, and it is possible to prevent the thermal energy applied when the braided part 50 is welded from being transferred to the peripheral area of the welding portion 17 and escaping. As a result, the welding portion 17 of the shield outer terminal

10 and the braided part 50 can be efficiently welded to each other without increasing the output of thermal energy applied for welding.

Further, the openings 13 formed of notched holes are formed in the end portion of the shield outer terminal 10, and the welding portions 17 formed of the protruding pieces are formed between the openings 13. Therefore, the braided part 50 can be welded by using these protruding pieces as the welding portions 17, and the shield outer terminal 10 and the braided part 50 can be electrically connected to each other. In addition, the welding portion 17 formed of the cantilevered protruding piece can prevent material yield from decreasing by simultaneously punching out the protruding pieces of a pair of shield outer terminals 10 when the shield outer terminals 10 are formed by pressing metal plates.

In the above embodiment, the cylindrical shield outer terminal 10 is exemplified, but the shield outer terminal 10 which is a shield member is not limited to a cylindrical shape, and may be a polygonal cylindrical shape.

Figure 6A:
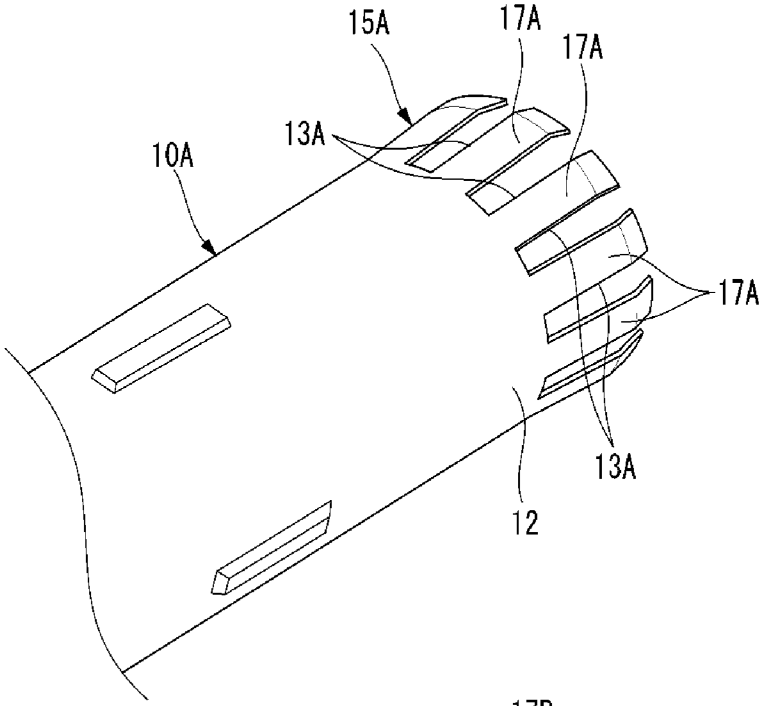
Figure 6B:
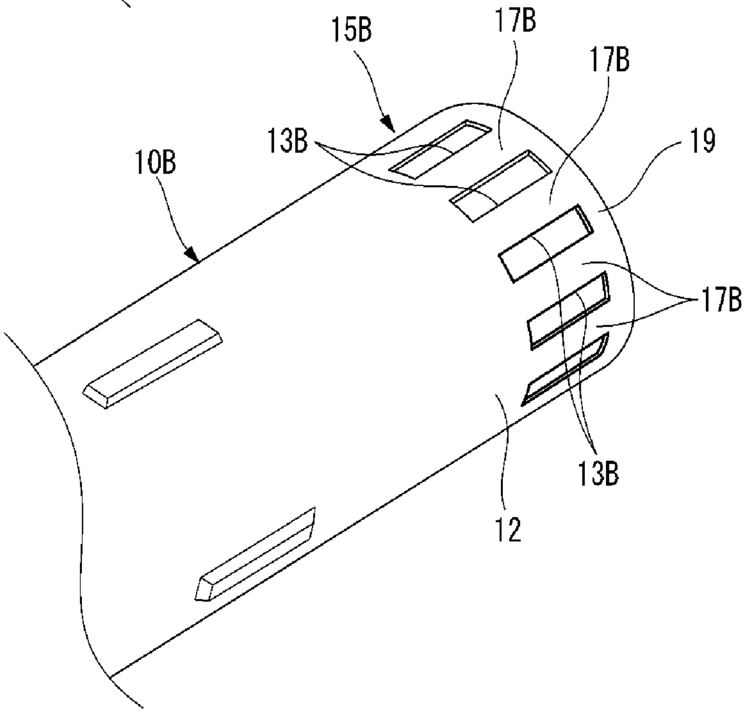

FIGS. 6A and 6B are views illustrating a braided part connection structure according to other embodiments of the present invention, in which FIG. 6A is a perspective view of a main part showing a modification of a welding portion 17A in a shield outer terminal 10A, and FIG. 6B is a perspective view of a main part showing a modification of a braided part joining portion 15B in a shield outer terminal 10B. As shown in FIG. 6B, in a braided part joining portion 15A of the shield outer terminal 10A, the welding portion 17A is formed between openings 13A adjacent to each other in the circumferential direction. The opening 13A of the braided part joining portion 15A is a notched hole having an open end, and the welding portion 17A is a cantilevered protruding piece formed between adjacent notched holes. Further, a distal end portion of the protruding piece is bent in a mountain shape protruding toward an outer peripheral side of the shield outer terminal 10A.

Therefore, according to the braided part connection structure of the present embodiment, the distal end portion of the welding portion 17A which is a cantilevered protruding piece is bent in a mountain shape, so that a distal end of the welding portion 17A is less likely to be caught when the braided part 50 covers the braided part joining portion 15A, and workability is improved.

As shown in FIG. 6B, the braided part joining portion 15B of a shield outer terminal 10B is provided in the vicinity of the end portion of the braided part connection end 12 of the shield outer terminal 10B. An opening 13B of the braided part joining portion 15B is a through hole formed in the vicinity of the end portion of the shield outer terminal 10B, and the welding portion 17B is a bridge piece formed between adjacent through holes.

Therefore, according to the braided part connection structure of the present embodiment, a plurality of openings 13B formed of through holes are formed in the vicinity of the end portion of the shield outer terminal 10B to form a bridge piece between the openings 13B. Therefore, the braided part 50 can be welded using the bridge piece which is made in a form of a double-supported beam having high rigidity as the welding portion 17B, and the welding operation can be stably performed.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, a braided part connection structure includes a braided part (50) having a tubular shape covering an insulated wire (51) along a longitudinal direction of the braided part connection structure and a shield member (for example, a shield outer terminal 10, 10A, 10B) having a tubular shape and electrically connected and fixed to the braided part (50). The shield member (for example, the shield outer terminal 10, 10A, 10B) includes a braided part joining portion (15, 15A, 15B) having a plurality of openings (13, 13A, 13B) arranged at intervals along a circumferential direction of the shield member in a portion of the shield member in the longitudinal direction, and a welding portion (17, 17A, 17B) defined by two openings (13, 13A, 13B) adjacent to each other of the plurality of openings (13, 13A, 13B). The braided part (50) covers the braided part joining portion (15, 15A, 15B) and is welded to the welding portion (17, 17A, 17B).

According to the braided part connection structure having the above configuration, the braided part covering the braided part joining portion of the shield member is welded to the welding portion between the plurality of openings formed at intervals along the circumferential direction. Therefore, in this braided part connection structure, a volume of the welding portion which is a portion of the shield member to which the braided part is to be welded is reduced, thereby reducing the heat capacity, and it is possible to prevent the thermal energy applied when the braided part is welded from being transferred to the peripheral area of the welding portion and escaping. As a result, the welding portion of the shield member and the braided part can be efficiently welded to each other without increasing the output of thermal energy applied for welding.

The braided part joining portion (15, 15A) may be provided at an end portion of the shield member (for example, the shield outer terminal 10, 10A). The plurality of openings (13, 13A) may be notched holes formed at the end portion of the shield member (for example, the shield outer terminal 10, 10A). The welding portion (17, 17A) may be a protruding piece formed between two notched holes adjacent to each other of the notched holes.

With this configuration, the opening formed of the notched hole is formed at the end portion of the shield member, and the cantilevered protruding piece is formed between the openings. Therefore, the braided part can be welded by using the protruding piece as the welding portion, and the shield member and the braided part can be electrically connected to each other. In addition, for example, the cantilevered protruding piece can prevent material yield from decreasing by simultaneously punching out protruding pieces of a pair of shield members when the shield members are formed by pressing metal plates.

A distal end portion of the protruding piece may be bent in a convex shape protruding outward in a radial direction of the shield member (for example, the shield outer terminal 10A).

With this configuration, the distal end portion of the cantilevered protruding piece is bent in a mountain shape, so that a distal end of the protruding piece is less likely to be caught when the braided part covers the braided part joining portion, and workability is improved.

The braided part joining portion (15B) may be provided in the vicinity of an end portion of the shield member (for example, the shield outer terminal 10B). The plurality of openings (13B) may be through holes formed in the vicinity of the end portion of the shield member (for example, the shield outer terminal 10B). The welding portion (17B) may be formed of a bridge piece formed between two through holes adjacent to each other of the through holes.

With this configuration, the openings formed of the through holes are formed in the vicinity of the end portion of the shield member, and the bridge piece is formed between the openings. Therefore, the braided part can be welded using the bridge piece which is made in a form of a double-supported beam having high rigidity as the welding portion, and the welding operation can be stably performed.

What is claimed is:

1. A braided part connection structure for a shielded cable, the shielded cable including an electric wire and an outer cover, the braided part connection structure comprising:

a braided part including a covered portion between the electric wire and the outer cover, and an exposed portion exposed outside of the outer cover and having a tubular shape covering an insulated wire along a longitudinal direction of the braided part connection structure, wherein a first part of the exposed portion is disposed between the covered portion and a second part of the exposed portion in the longitudinal direction; and a shield member having a tubular shape and electrically connected and fixed to the braided part, wherein the shield member includes a braided part joining portion, the braided part joining portion having a plurality of openings and a welding portion, the plurality of openings being arranged at intervals along a circumferential direction of the shield member in a portion of the shield member in the longitudinal direction, and the welding portion being defined by two openings adjacent to each other of the plurality of openings, wherein the second part of the exposed portion of the braided part covers the braided part joining portion and is welded to the welding portion, wherein the braided part joining portion and the welding portion, both being covered by and welded to the second part of the exposed portion of the braided part, and the second part of the exposed portion of the braided part are spaced away from the outer cover in the longitudinal direction by the first part of the exposed portion of the braided part, and wherein an end of the shield member, where the braided part joining portion is disposed, faces the covered portion in the longitudinal direction.

2. The braided part connection structure according to claim 1, wherein the braided part joining portion is provided at an end portion of the shield member, wherein the plurality of openings are notched holes formed at the end portion of the shield member, and wherein the welding portion is a protruding piece formed between two notched holes adjacent to each other of the notched holes.

3. The braided part connection structure according to claim 2, wherein a distal end portion of the protruding piece is bent in a convex shape protruding outward in a radial direction of the shield member.

4. The braided part connection structure according to claim 1, wherein the braided part joining portion is provided in the vicinity of an end portion of the shield member, wherein the plurality of openings are through holes formed in the vicinity of the end portion of the shield member, and wherein the welding portion is formed of a bridge piece formed between two through holes adjacent to each other of the through holes.

5. The braided part connection structure according to claim 1, further comprising a plurality of said welded portions, wherein the plurality of openings includes at least three openings, and wherein each adjacent pair of the at least three openings includes a respective one of said plurality of said welded portions therebetween.

6. The braided part connection structure according to claim 1, wherein the covered portion, the first part of the exposed portion and the second part of the exposed portion are arranged in that order along the longitudinal direction; and wherein the second part of the exposed portion expands outwardly relative to the first part of the exposed portion along the longitudinal direction.

7. The braided part connection structure according to claim 1, wherein the covered portion is disposed at a first side in the longitudinal direction with respect to the first part of the exposed portion, wherein the second part of the exposed portion is disposed at a second side in the longitudinal direction with respect to the first part of the exposed portion, wherein the shield member includes a fitting end, wherein, in the shield member, the braided part joining portion is disposed at the first side in the longitudinal direction with respect to the fitting end.

8. The braided part connection structure according to claim 1, wherein neither the first part of the exposed portion nor the second part of the exposed portion overlaps any other portion of the braided part in a direction perpendicular to the longitudinal direction.

* * * * *